US012559404B2

(12) United States Patent
Xu et al.

(10) Patent No.: US 12,559,404 B2
(45) Date of Patent: Feb. 24, 2026

(54) CURVED GLASS AND PREPARATION METHOD THEREFOR, AND ELECTRONIC DEVICE

(71) Applicant: Honor Device Co., Ltd., Shenzhen (CN)

(72) Inventors: Wenbin Xu, Shenzhen (CN); Kun Liu, Shenzhen (CN); Changfu Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 740 days.

(21) Appl. No.: 17/910,559

(22) PCT Filed: Feb. 28, 2022

(86) PCT No.: PCT/CN2022/078502
§ 371 (c)(1),
(2) Date: Sep. 9, 2022

(87) PCT Pub. No.: WO2022/257509
PCT Pub. Date: Dec. 15, 2022

(65) Prior Publication Data
US 2024/0294414 A1 Sep. 5, 2024

(30) Foreign Application Priority Data

Jun. 11, 2021 (CN) .......................... 202110656751.9

(51) Int. Cl.
*C03B 11/10* (2006.01)
*C03B 11/12* (2006.01)
(Continued)

(52) U.S. Cl.
CPC ............ *C03B 11/10* (2013.01); *C03B 11/122* (2013.01); *C03B 25/00* (2013.01); *C03B 32/02* (2013.01)

(58) Field of Classification Search
CPC ........................ C03B 19/02–025; C03B 11/10
See application file for complete search history.

(56) References Cited

U.S. PATENT DOCUMENTS 3,874,777 A * 4/1975 Deeg ........................ C03B 11/08
351/159.48
4,046,540 A * 9/1977 Lewis ........................ C03C 3/16
65/144
(Continued)

FOREIGN PATENT DOCUMENTS

CN 1306946 A 8/2001
CN 106830650 A 6/2017
(Continued)

*Primary Examiner* — Erin Snelting
(74) *Attorney, Agent, or Firm* — Slater Matsil, LLP

(57) ABSTRACT

A curved glass and a preparation method is provided. The preparation method for curved glass includes: melting a glass batch into a glass liquid, and clearing the glass liquid; introducing the cleared glass liquid into a mold cavity with a preset shape, and forming, by using a compression molding process, a glass product with a shape corresponding to that of the curved glass, where a size of the glass product is greater than a size of the curved glass; annealing the molded glass product; and processing the annealed glass product into the curved glass based on the shape and the size of the curved glass.

20 Claims, 6 Drawing Sheets

(51) Int. Cl.
    *C03B 25/00*        (2006.01)
    *C03B 32/02*        (2006.01)

(56) References Cited

U.S. PATENT DOCUMENTS

| | | | | |
|---|---|---|---|---|
| 5,588,979 A * | 12/1996 | Miyazaki | C03B 11/02 | |
| | | | 65/355 | |
| 6,426,311 B1 | 7/2002 | Goto et al. | | |
| 11,174,189 B2 | 11/2021 | Li et al. | | |
| 11,535,548 B2 | 12/2022 | Murayama et al. | | |
| 2015/0225275 A1 | 8/2015 | Tomisaka | | |
| 2016/0185051 A1 | 6/2016 | Delfino et al. | | |
| 2018/0141853 A1 | 5/2018 | Momono | | |
| 2018/0194669 A1 | 7/2018 | Ding et al. | | |
| 2020/0115268 A1 | 4/2020 | Li et al. | | |
| 2020/0346969 A1 | 11/2020 | Li et al. | | |
| 2021/0214269 A1 | 7/2021 | Yuki | | |
| 2022/0002189 A1 | 1/2022 | Furuta et al. | | |

FOREIGN PATENT DOCUMENTS

| | | | |
|---|---|---|---|
| CN | 108821574 A | 11/2018 |
| CN | 109095755 A | 12/2018 |
| CN | 109320056 A | 2/2019 |
| CN | 109320091 A | 2/2019 |
| CN | 109626816 A | 4/2019 |
| CN | 109843823 A | 6/2019 |
| CN | 110372216 A | 10/2019 |
| CN | 110963709 A | 4/2020 |
| CN | 111320391 A | 6/2020 |
| CN | 111757858 A | 10/2020 |
| CN | 112166091 A | 1/2021 |
| CN | 112897863 A | 6/2021 |
| CN | 113646278 A | 11/2021 |
| JP | 2014091655 A | 5/2014 |
| JP | 2016003171 A | 1/2016 |
| JP | 2016527360 A | 9/2016 |
| JP | 2017001937 A | 1/2017 |
| JP | 2017519715 A | 7/2017 |
| JP | 2020063182 A | 4/2020 |
| WO | 2014050376 A1 | 4/2014 |

* cited by examiner

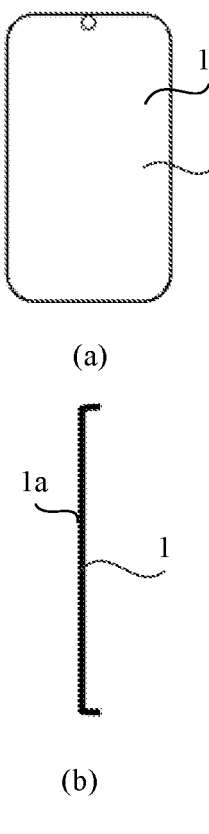

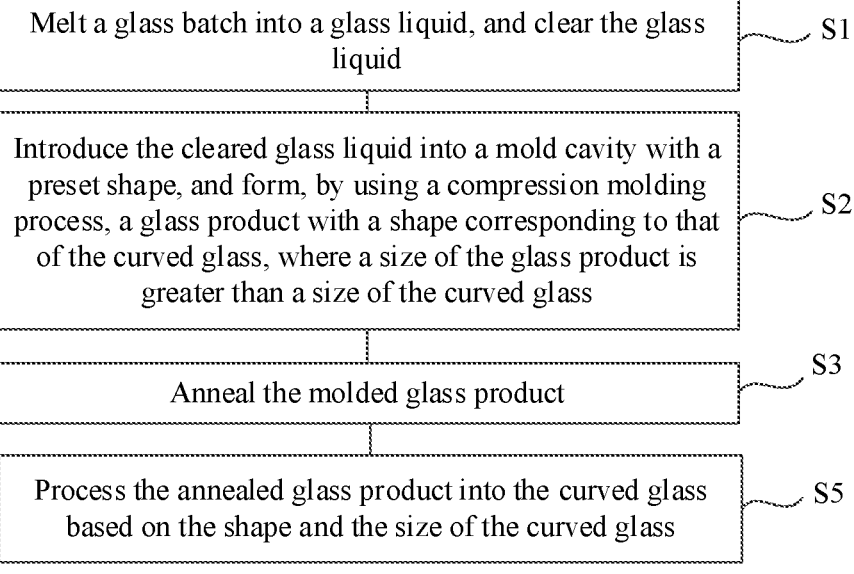

| Melt a glass batch into a glass liquid, and clear the glass liquid | S1 |
| Introduce the cleared glass liquid into a mold cavity with a preset shape, and form, by using a compression molding process, a glass product with a shape corresponding to that of the curved glass, where a size of the glass product is greater than a size of the curved glass | S2 |
| Anneal the molded glass product | S3 |
| Process the annealed glass product into the curved glass based on the shape and the size of the curved glass | S5 |

FIG. 2

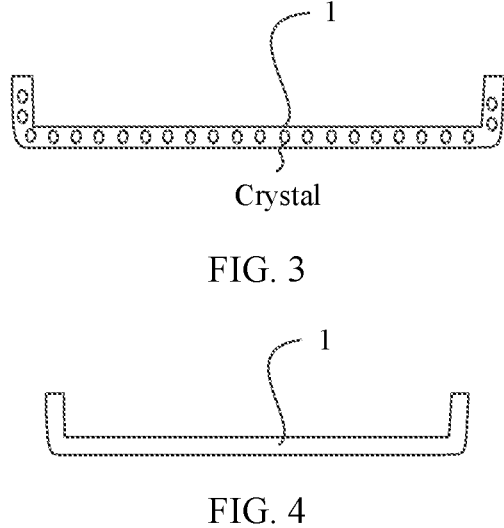
Crystal
FIG. 3
1
FIG. 4
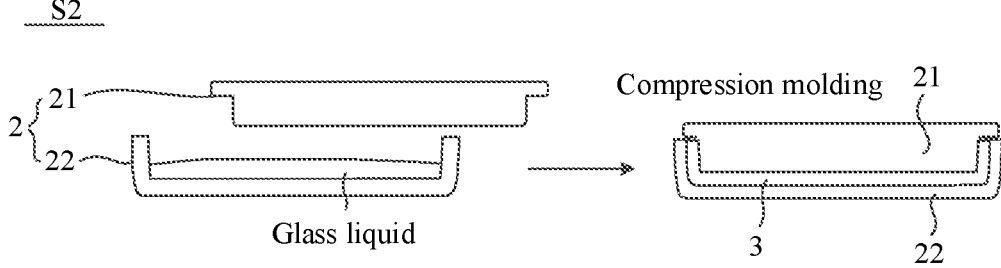
FIG. 5

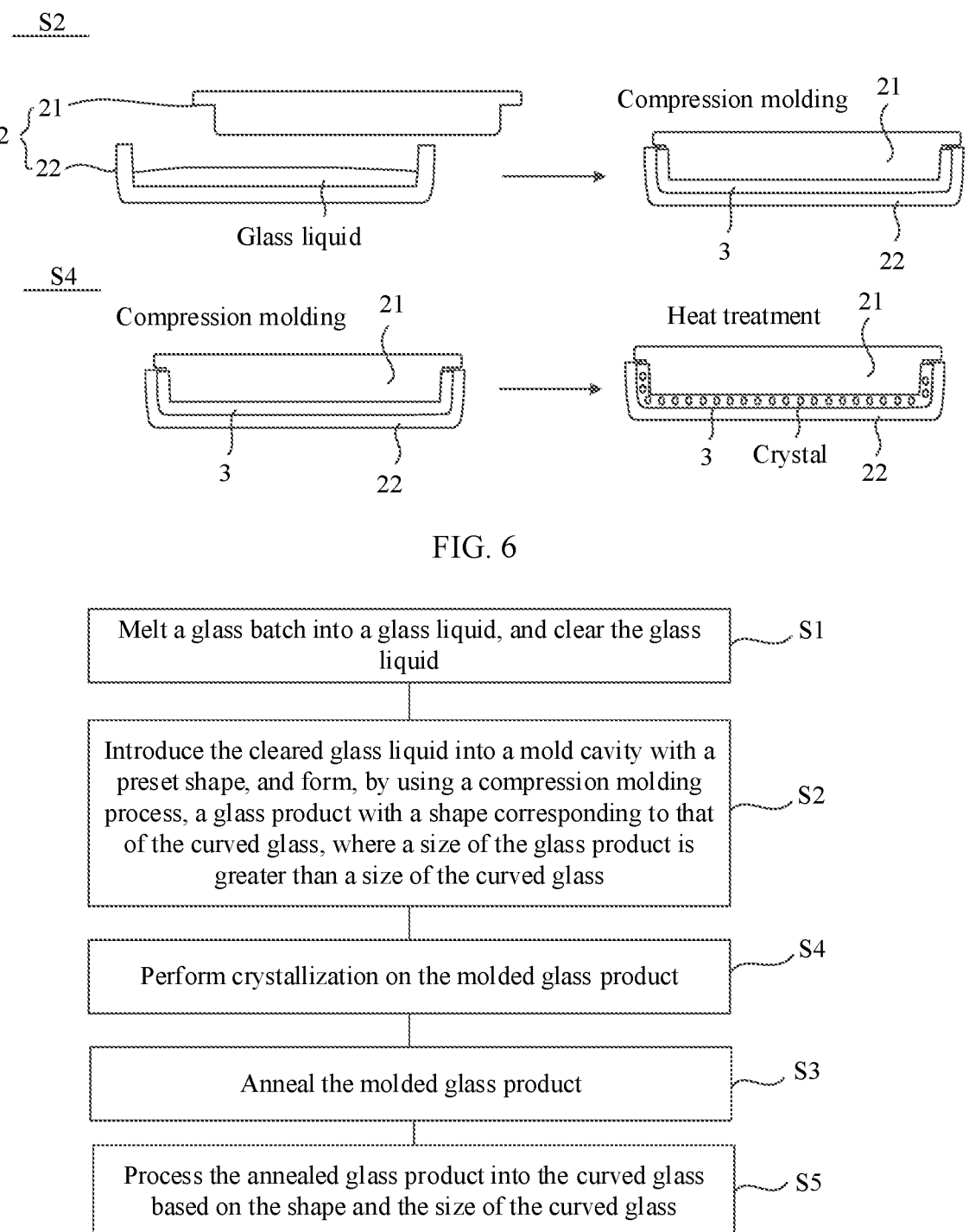

FIG. 6

| | |
|---|---|
| Melt a glass batch into a glass liquid, and clear the glass liquid | S1 |
| Introduce the cleared glass liquid into a mold cavity with a preset shape, and form, by using a compression molding process, a glass product with a shape corresponding to that of the curved glass, where a size of the glass product is greater than a size of the curved glass | S2 |
| Perform crystallization on the molded glass product | S4 |
| Anneal the molded glass product | S3 |
| Process the annealed glass product into the curved glass based on the shape and the size of the curved glass | S5 |

FIG. 7

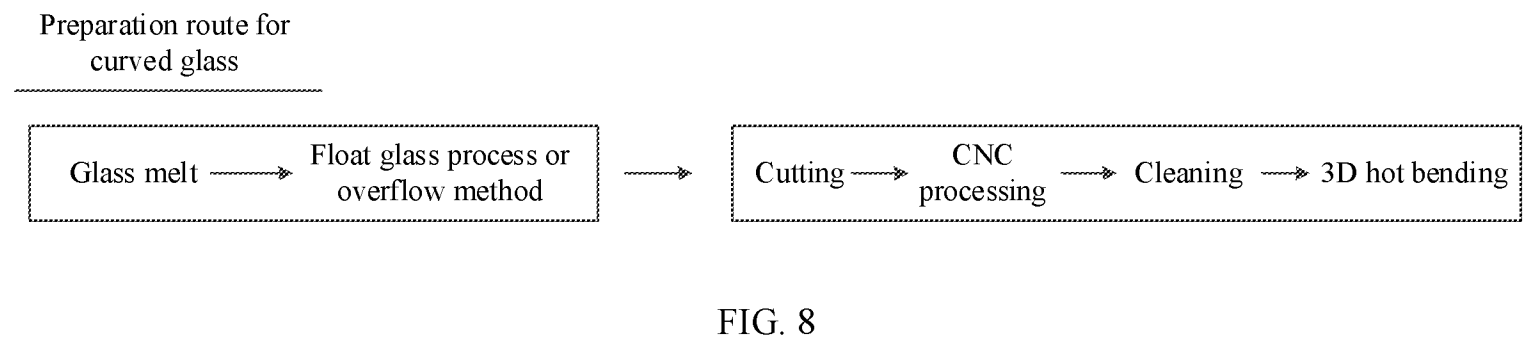

Preparation route for
curved glass

Glass melt ——→ Float glass process or ——→ Cutting ——→ CNC ——→ Cleaning ——→ 3D hot bending
                  overflow method                        processing

FIG. 8

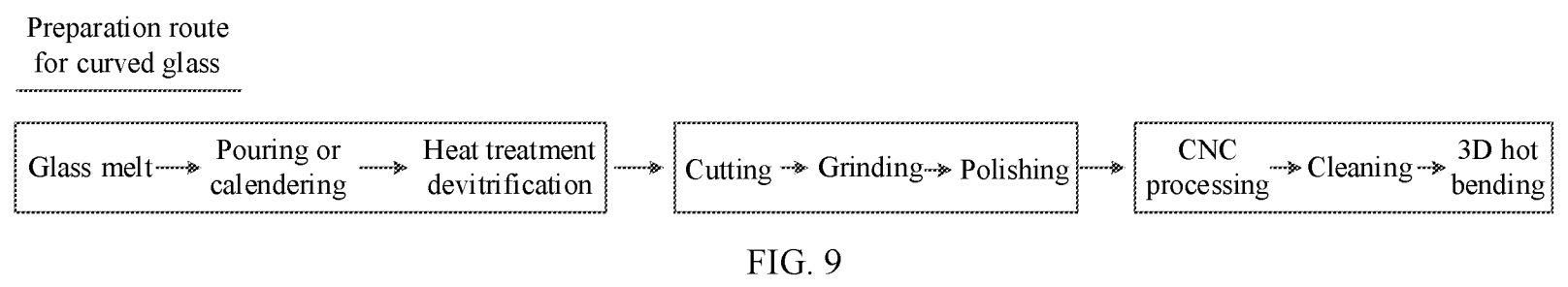

Preparation route
for curved glass

Glass melt ⟶ Pouring or calendering ⟶ Heat treatment devitrification ⟶ Cutting ⟶ Grinding ⟶ Polishing ⟶ CNC processing ⟶ Cleaning ⟶ 3D hot bending

FIG. 9

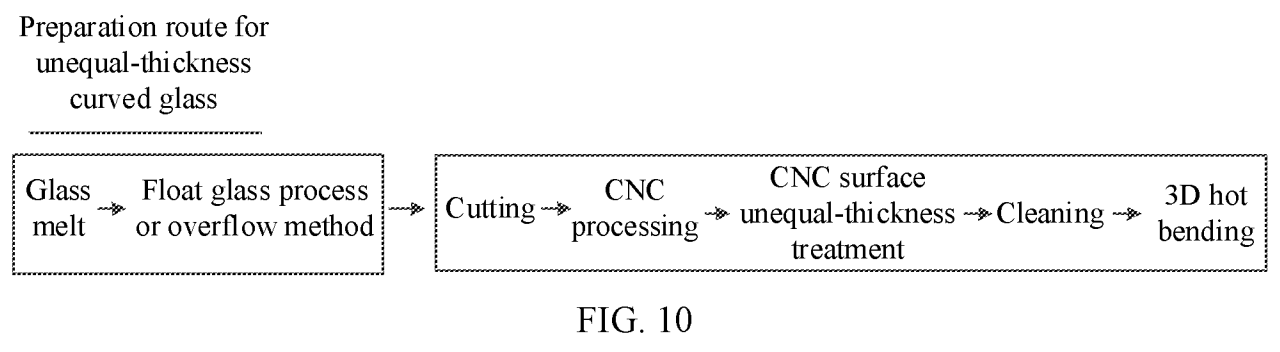

Preparation route for
unequal-thickness
curved glass

Glass → Float glass process → CNC → CNC surface → Cleaning → 3D hot
melt    or overflow method    processing    unequal-thickness    bending
                                            treatment

FIG. 10

CURVED GLASS AND PREPARATION METHOD THEREFOR, AND ELECTRONIC DEVICE

CROSS-REFERENCE TO RELATED APPLICATIONS

This application is a National Stage of International Application No. PCT/CN2022/078502, filed Feb. 28, 2022, which claims priority to Chinese Patent Application No. 202110656751.9, filed Jun. 11, 2021, both of which are hereby incorporated by reference in their entireties.

TECHNICAL FIELD

This application relates to the technical field of electronic products, and in particular, to curved glass and a preparation method therefor, and an electronic device.

BACKGROUND

Currently, curved glass is widely applied to electronic devices. For example, the curved glass may be used as a cover plate in a terminal product (such as a mobile phone or a tablet computer).

SUMMARY

A main purpose of this application is to provide curved glass and a preparation method therefor, and an electronic device. A molding process from a high temperature to a low temperature can be reduced, and a preparation process can be shortened. Therefore, a resource waste caused by a high temperature to a low temperature in a related technology can be reduced, and manufacturing costs are reduced.

To achieve the foregoing objective, the present invention uses the following technical solutions:

According to a first aspect, this application provides a preparation method for curved glass, including: melting a glass batch into a glass liquid, and clearing the glass liquid; introducing the cleared glass liquid into a mold cavity with a preset shape, and forming, by using a compression molding process, a glass product with a shape corresponding to that of the curved glass, where a size of the glass product is greater than a size of the curved glass; annealing the molded glass product; and processing the annealed glass product into the curved glass based on the shape and the size of the curved glass. A glass melt is directly introduced into a mold, and a 3D form required for curved glass is prepared by a compression molding process, and then gradually cooled to a room temperature. The cooled 3D glass can be machined subsequently to obtain curved glass. Compared with a related technology in which the curved glass is formed from plate glass (that is, 2D glass) by means of hot bending, a resource waste caused by a high temperature to a low temperature can be reduced because a forming process of the plate glass from a high temperature to a low temperature is omitted, and production costs of the curved glass can be reduced.

In an implementation of the first aspect, a difference between a temperature of the cleared glass liquid and a temperature of the mold is greater than or equal to 250° C. and less than or equal to 500° C. When the curved glass is base glass, the difference between the temperature of the cleared glass liquid and the temperature of the mold is controlled within the foregoing range, so as to avoid that when the glass liquid is cooled too fast, glass is broken due to a glass tensile stress caused by cooling, and when the glass liquid is cooled too slow, there is a risk that glass devitrification loses transparency.

In an implementation of the first aspect, the temperature of the cleared glass liquid is 950° C.-1300° C., and the temperature of the mold is 450° C.-800° C. For example, the glass batch may include silicon sand (silicon dioxide or quartz sand), phosphorus pentoxide, alumina, boron oxide, lithium carbonate, sodium carbonate, potassium carbonate, magnesium carbonate, and calcium carbonate for preparing curved glass.

In an implementation of the first aspect, the curved glass is glass ceramics; the glass batch further includes a nucleation agent; and after the introducing the cleared glass liquid into a mold cavity with a preset shape, and forming, by using a compression molding process, a glass product with a shape corresponding to that of the curved glass, and before the annealing the molded glass product, the method further includes: performing crystallization on the molded glass product. After 3D glass is formed in the mold, crystallization may be directly performed on the glass product, thereby improving preparation efficiency. In addition, by adding a nucleation agent to the glass batch, it is more conducive to controlling a crystallization process, to obtain glass ceramics with a relatively high crystallinity degree, which can increase a crystallization rate.

In an implementation of the first aspect, a difference between a temperature of the cleared glass liquid and a temperature of the mold is greater than or equal to 500° C. and less than or equal to 800° C. When the curved glass is glass ceramics, the difference between the temperature of the cleared glass liquid and the temperature of the mold is controlled within the foregoing range, which is different from the case that the curved glass is base glass and glass breaking due to too fast cooling of the glass liquid does not to be considered. On the contrary, glass devitrification is easy to occur when the glass liquid is cooled too slow, and the crystal nucleus grows rapidly, which makes the glass easy to break. In addition, same as the case that the curved glass is base glass, there exists a problem that glass devitrification loses transparency due to a failure to effectively control a glass devitrification condition when the glass liquid is cooled too slow.

In an implementation of the first aspect, the temperature of the cleared glass liquid is 950° C.-1300° C., and the temperature of the mold is 250° C.-500° C. For example, the glass batch may include silicon sand (silicon dioxide or quartz sand), phosphorus pentoxide, alumina, boron oxide, lithium carbonate, sodium carbonate, potassium carbonate, magnesium carbonate, calcium carbonate, and zirconium oxide for preparing curved glass ceramics.

In an implementation of the first aspect, the performing crystallization on the molded glass product includes: performing heat treatment on the molded glass product, so that a split phase is generated, a crystal nucleus is formed, and a crystal is grown in the molded glass product.

In an implementation of the first aspect, the performing heat treatment on the molded glass product includes: placing the molded glass product in a heating cavity, and performing heat treatment on the heating cavity; or successively transferring the molded glass product to a plurality of heating cavities whose temperatures gradually increase, and insulating the molded glass product for a preset time in each heating cavity, so as to perform heat treatment on the molded glass product.

In an implementation of the first aspect, a temperature change range of the heat treatment is from a first temperature to a second temperature; and the first temperature is a temperature of a mold corresponding to the molded glass product, and a difference between the second temperature and the first temperature is greater than or equal to 100° C. and less than or equal to 400° C. A temperature condition required for crystal growth in the glass ceramics can be met, and a crystallinity degree can be increased.

In an implementation of the first aspect, the annealing the molded glass product includes: performing programmed cooling on the molded glass product, so that the molded glass product is cooled to a room temperature. Programmed cooling is a process of cooling through program control. For example, a programmed heating cavity setting program may be used to reduce the glass product from a temperature after demolding to the room temperature, so that slow cooling and releasing thermal stress to the room temperature can be implemented.

In an implementation of the first aspect, the performing programmed cooling on the molded glass product, so that the molded glass product is cooled to a room temperature includes: placing the molded glass product in a heating cavity, and performing programmed cooling on the heating cavity; or successively transferring the molded glass product to a plurality of heating cavities whose temperatures gradually decrease, and insulating the molded glass product for a preset time in each heating cavity, so as to perform programmed cooling on the molded glass product.

In an implementation of the first aspect, a speed of the programmed cooling is 1° C./min-100° C./min.

In an implementation of the first aspect, in the compression molding process, a difference between a size of a die clearance and a thickness of the curved glass at a corresponding position is greater than or equal to 0 and less than or equal to 0.1 mm. Uniformity of the die clearance can be kept as far as possible, so as to prevent a case in which the die clearance is too large or too small.

In an implementation of the first aspect, in the compression molding process, molding pressure is 0.1 Mpa-0.5 MPa. Molding quality can be improved.

In an implementation of the first aspect, in the compression molding process, a working environment of molding is a vacuum or inert gas protection atmosphere.

In an implementation of the first aspect, a difference between the size of the glass product and the size of the curved glass is greater than or equal to 0.02 mm and less than or equal to 0.5 mm. The size and the shape of the glass product may be changed by means of CNC (Computerized Numerical Control, computerized numerical control) precision machining, to obtain curved glass with stable processing quality, high processing precision, and high repetition precision, which can be used for batch production.

According to a second aspect, curved glass prepared by using the foregoing preparation method for curved glass is provided. The curved glass may meet a design requirement of a cover plate of an electronic device, and a crystallinity degree of curved glass ceramics may meet an application requirement.

In an implementation of the second aspect, when the curved glass is base glass, a Vickers hardness of the curved glass is 550 kgf/mm$^2$-650 kgf/mm$^2$; and when the curved glass is glass ceramics, a Vickers hardness of the curved glass is 650 kgf/mm$^2$-750 kgf/mm$^2$. Under a same test condition, the curved glass has an approximately equivalent hardness to that of the curved glass prepared in the related technology, and can meet an application requirement.

In an implementation of the second aspect, when the curved glass is base glass, a Young's modulus of the curved glass is 70 Gpa-90 Gpa; and when the curved glass is glass ceramics, a Young's modulus of the curved glass is 90 Gpa-105 Gpa. Under a same test condition, the curved glass has an approximately equivalent Young's modulus to that of the curved glass prepared in the related technology, and can meet an application requirement.

In an implementation of the second aspect, when the curved glass is base glass, a density of the curved glass is 2.4 g/cm$^3$-2.5 g/cm$^3$; and when the curved glass is glass ceramics, a density of the curved glass is 2.45 g/cm$^3$-2.65 g/cm$^3$. Under a same test condition, the density of the curved glass is approximately the same as a density of the curved glass prepared in the related technology, and can meet an application requirement.

In an implementation of the second aspect, when the curved glass is base glass, a thermal expansion coefficient of the curved glass is $60 \times 10^{-7}$/° C.-$110 \times 10^{-7}$/° C.; and when the curved glass is glass ceramics, a thermal expansion coefficient of the curved glass is $100 \times 10^{-7}$/° C.-$110 \times 10^{-7}$/° C. Under a same test condition, the thermal expansion coefficient of the curved glass 1 is equivalent to a thermal expansion coefficient of the curved glass prepared in the related technology, and can meet an application requirement.

In an implementation of the second aspect, when the curved glass is glass ceramics, and a principal crystalline phase of the curved glass includes one or two of petalite and lithium disilicate, a crystallinity degree of the curved glass is 75 wt %-90 wt %; and when the principal crystalline phase of the curved glass is lithium metasilicate or cordierite, a crystallinity degree of the curved glass is 30 wt %-50 wt %. When a heat treatment system is the same, the curved glass has a crystallinity degree and a principal crystalline phase that are approximately the same as those of the curved glass prepared in the related technology.

According to a third aspect, an electronic device is provided, including the curved glass described above.

In an implementation of the third aspect, the electronic device is a mobile phone, a tablet computer, or a wearable intelligent product.

This application provides curved glass and a preparation method therefor, and an electronic device. A glass melt is directly introduced into a mold, and a 3D form required for curved glass is prepared by a compression molding process, and then gradually cooled to a room temperature. The shape and size of the cooled 3D glass are trimmed by using CNC machining to obtain curved glass. Compared with a related technology in which the curved glass is formed from plate glass (that is, 2D glass) by means of hot bending, a resource waste caused by a high temperature to a low temperature can be reduced because a forming process of the plate glass from a high temperature to a low temperature is omitted, and production costs of the curved glass can be reduced.

BRIEF DESCRIPTION OF THE DRAWINGS

FIG. 1 is a structural diagram of curved glass used as front and rear covers of a mobile phone according to this application;

FIG. 2 is a flowchart of a preparation method for curved glass according to this application;

FIG. 3 is an internal structural diagram of curved glass according to this application;

FIG. 4 is an internal structural diagram of another curved glass according to this application;

FIG. 5 is a flowchart of a preparation method for a glass product according to this application;

FIG. 6 is a flowchart of another preparation method for a glass product according to this application;

FIG. 7 is a flowchart of another preparation method for curved glass according to this application;

FIG. 8 is a flowchart of a preparation method for curved glass according to a related technology;

FIG. 9 is a flowchart of another preparation method for curved glass according to a related technology; and FIG. 10 is a flowchart of still another preparation method for curved glass according to a related technology.

DETAILED DESCRIPTION OF ILLUSTRATIVE EMBODIMENTS

The following describes in detail embodiments of this application with reference to accompanying drawings.

Some embodiments of the present disclosure provide an electronic device, and the electronic device includes curved glass. The electronic device may also be referred to as an electronic product or a terminal, and may include a mobile phone, a mobile computer, an electronic book, a portable android device (portable android device, Pad), a smart television, a personal digital assistant (Personal Digital Assistant, PDA), a wearable intelligent product, and the like. The wearable intelligent product may include but is not limited to a media player, a smart watch, smart glasses, a smart band, and the like.

The curved glass is described relative to plate glass. According to whether one surface of the curved glass is a curved surface or both surfaces thereof are curved surfaces, the curved glass may include single-curved glass and double-curved glass.

In some embodiments, the electronic device may be a mobile phone, a tablet computer, or a wearable intelligent product.

As shown in FIG. 1, FIG. 1 shows a case in which curved glass 1 serves as a cover plate for front and rear covers of a mobile phone, and the curved glass 1 is double-curved glass. (a) of FIG. 1 is a front view of the curved glass 1 serving as a cover plate for the front and rear covers of the mobile phone. (b) in FIG. 1 is a side view of the curved glass 1 serving as a cover plate for the front and rear covers of the mobile phone.

In some embodiments, when the curved glass 1 is applied to an electronic device as a cover plate, a paint layer and/or a fingerprint-proof layer may further be disposed on a surface 1a of the curved glass 1.

The curved glass 1 may be made of a silicon-aluminum glass material, and the paint layer may be formed by using a silk-screen printing ink. The fingerprint-proof layer is a coating formed by applying a colorless and odorless transparent liquid, so that a material such as glass, metal, ceramic, and plastic can be waterproof, anti-grease, fingerprint-proof, and a product surface is smooth and can be used to prevent a fingerprint.

Some embodiments of the present disclosure provide a preparation method for curved glass 1. As shown in FIG. 2, the method includes the following steps.

S1. Melt a glass batch into a glass liquid, and clear the glass liquid.

The curved glass 1 may be made of a silicon-aluminum glass material. In this case, the glass batch is an aluminum-silicon glass material. For example, a sum of molar percentages of $Al_2O_3$ and $SiO_2$ is greater than 75 mol %. Compared with conventional sodium-calcium glass, the curved glass 1 has better physical and chemical characteristics.

For example, in some embodiments, the glass batch of the curved glass 1 may include silicon sand (silicon dioxide or quartz sand), phosphorus pentoxide, alumina, boron oxide, lithium carbonate, sodium carbonate, potassium carbonate, magnesium carbonate, and calcium carbonate.

In these embodiments, the curved glass 1 has better chemical stability, electrical insulation, mechanical strength, and a lower thermal expansion coefficient.

According to whether a crystal exists in the curved glass 1, there may be two possible cases. In a first case, as shown in FIG. 3, the curved glass 1 is glass ceramics. In this case, a large quantity of micro crystals are precipitated in the curved glass 1, and the curved glass 1 is a multiphase complex composed of a microcrystalline phase and a glass phase. In a second case, as shown in FIG. 4, the curved glass 1 is not glass ceramics. In this case, no crystal exists in the curved glass 1, that is, the curved glass 1 is fragile base glass. Base glass is a precursor of glass ceramics, is a state in which no crystal is precipitated, and is composed of a crystal and a glass body. The base glass has dual characteristics of glass and ceramics. The base glass is more transparent than ceramics, has a stronger toughness than the glass, has a better application prospect, and can be used as a mechanical structure material, an electronic and electrical insulation material, a base plate material of a large-scale integrated circuit, a microwave furnace heat-resisting device, a chemical and corrosion-resisting material, and a mine wear-resisting material. The base glass has a high mechanical strength, an excellent insulation property, a low dielectric loss, and a stable dielectric constant. A thermal expansion coefficient of the base glass can be adjusted within a large range, and the base glass has advantages of chemical corrosion resistance, wear resistance, good thermal stability, and a high use temperature.

In some embodiments, as shown in FIG. 3, the curved glass 1 is glass ceramics.

In these embodiments, the glass ceramics may be obtained by crystallizing the base glass. The base glass is an amorphous solid. From a thermodynamical point of view, the base glass is in a metastable state (that is, a material is present in a state of free energy higher than an equilibrium state and is in a non-equilibrium metastable state), and has higher internal energy than a crystal. Therefore, in a specific condition, the base glass can be converted to a crystalline state. From a dynamics point of view, during a cooling process, a viscosity of a glass melt (that is, the glass liquid obtained by melting) increases rapidly, thus formation of a crystal nucleus and growth of a crystal are suppressed, and growth of a crystalline solid is prevented. When a nucleation agent is not added, by using a heterogeneous crystallizing mechanism, a thermodynamically possibility and kinetic suppression are fully used, and in a specific condition, a new balance is formed in physical processes that are complementary to each other, to obtain glass ceramics. However, in this manner, the heterogeneous crystallizing mechanism is used to obtain glass ceramics with relatively poor uniformity. When a nucleation agent is added, a crystal nucleus is formed in the base glass, and then the crystal nucleus is grown by heat treatment, to obtain uniformly distributed glass ceramics.

Therefore, in some embodiments of the present disclosure, when the curved glass 1 is glass ceramics, the glass batch of the curved glass 1 further includes a nucleation agent. By adding the nucleation agent to the glass batch, it is more conducive to controlling a crystallization process than the case in which the nucleation agent is not added, so as to obtain glass ceramics with a high crystallinity degree and uniform distribution, and a crystallization rate can be increased.

In the foregoing example, when the curved glass 1 is glass ceramics, in addition to the foregoing components, the glass batch of the curved glass 1 further includes a nucleation agent such as zirconia. A molar percentage of zirconia in the glass batch may be greater than 0 and less than or equal to 10%.

During the melting process of the glass batch of the curved glass 1, the glass batch is decomposed (gasified) at a high temperature to generate a gas. By adding a clarifying agent to the glass liquid, bubbles in the glass liquid can be eliminated, and a viscosity of the glass liquid can be reduced.

The glass batch of the curved glass 1 includes silicon sand (silicon dioxide or quartz sand), phosphorus pentoxide, alumina, boron oxide, lithium carbonate, sodium carbonate, potassium carbonate, magnesium carbonate, calcium carbonate, and the like. In the glass melting process, sodium carbonate, lithium carbonate, potassium carbonate, magnesium carbonate, calcium carbonate, and the like may be decomposed at a high temperature to generate carbon dioxide. After clarification, the composition of the glass liquid may include: $SiO_2$, $Al_2O_3$, $P_2O$, $B_2O_3$, $Li_2O$, $Na_2O$, $K_2O$, MgO, CaO, and the like.

In some examples, when the curved glass 1 is base glass, a molar percentage of $SiO_2$, $Al_2O_3$, $P_2O$ and $B_2O_3$ may be 70%-85%, a molar percentage of $Li_2O$, $Na_2O$ and $K_2O$ may be 7%-30%, and a molar percentage of MgO and CaO may be 0%-8%.

When the curved glass 1 is glass ceramics, a molar percentage of $SiO_2$, $Al_2O_3$, $P_2O$ and $B_2O_3$ may be 70%-85%, a molar percentage of $Li_2O$, $Na_2O$ and $K_2O$ may be 7%-24%, a molar percentage of MgO and CaO may be 0%-6%, and a molar percentage of zirconia may be 0%-10%.

According to the foregoing case in which glass ceramics with a relatively high crystallinity degree and uniform distribution can be obtained when the glass batch of the curved glass 1 further includes a nucleation agent, it may be learned that in some embodiments, a molar percentage of zirconia is 1%-10%. That is, the molar percentage of zirconia is greater than or equal to 1%.

S2. As shown in FIG. 5 and FIG. 6, the cleared glass liquid is introduced into a mold 2 cavity with a preset shape, and form, by using a compression molding process, a glass product 3 with a shape corresponding to that of the curved glass 1, where a size of the glass product 3 is greater than a size of the curved glass 1.

The mold 2 includes a movable mold 21 and a fixed mold 22 (or a convex mold and a concave mold), and the two may be combined or separated. When the molds are separated, a workpiece is taken out; and when the molds are combined, a molding material is injected into the mold 2 cavity for molding.

Molding pressing refers to compression molding. It is a processing method in which a molding material is formed into a product by means of heating and pressuring in a closed mold cavity (that is, a mold cavity).

Based on that glass is a mixture, is an amorphous body, is different from a crystalline material, and does not have a fixed boiling point, it may be learned that glass is converted from a solid to a liquid within a specific temperature range (that is, a softening temperature range). The softening temperature range is from Tg to T1, Tg is a transition temperature, and T1 is a liquidus temperature. The transition temperature refers to a temperature corresponding to transition from a glass state to a high elastic state, and the liquidus temperature is a highest temperature at which an object starts to change from a liquid state to a solid state.

In the foregoing embodiment, the cleared glass liquid is introduced into the mold 2 cavity with a preset shape, and the temperature of the mold 2 is controlled. Under pressurization, the cleared glass liquid is cooled from a molten state to a glass state in a cooling process, to obtain a glass product 3 whose appearance is approximately the same as that of the mold 2 cavity. The preset shape of the mold 2 cavity may be approximately the same as that of the curved glass 1. In this way, the glass product 3 whose shape is approximately the same as that of the curved glass 1 can be obtained. The curved glass 1 may be obtained by controlling a size of the glass product 3 to be greater than the size of the curved glass 1 and further processing (such as cutting and polishing) the glass product 3.

Based on that the foregoing glass state is generally obtained by means of rapid cooling from the molten state, it may be learned that when the molten state changes to the glass state, a glass viscosity rapidly increases in the cooling process, material points are not arranged regularly due to a lack of time but form crystals, and latent heat of crystallization is not released. Therefore, a glass state material has relatively high internal energy than a crystalline state material, and energy of the glass state material is between that of the molten state and that of the crystalline state, and belongs to a metastable state. From a mechanical point of view, glass is in an unstable high energy state, for example, there is a tendency of low energy state conversion, that is, there is a tendency of devitrification. Therefore, when the curved glass 1 is base glass, in the process of cooling the glass liquid, to avoid that when the glass liquid is cooled too fast, glass is broken due to a glass tensile stress caused by cooling, and when the glass liquid is cooled too slow, there is a risk that glass devitrification loses transparency, optionally, as shown in FIG. 5, a temperature difference between the cleared glass liquid and the mold 2 is greater than or equal to 250° C. or less than or equal to 500° C. However, when the curved glass 1 is glass ceramics, different from the case that the curved glass 1 is base glass, when the glass liquid is cooled too slow, glass devitrification is easy to occur, and a crystal nucleus grows fast, which makes the glass easy to break. In addition, same as the case that the curved glass 1 is base glass, because the glass liquid is cooled too slow, glass devitrification loses transparency due to an inability to effectively control a glass devitrification condition. Therefore, optionally, as shown in FIG. 6, when the curved glass 1 is glass ceramics, a temperature difference between the cleared glass liquid and the mold 2 is greater than or equal to 500° C. and less than or equal to 800° C.

Based on the foregoing example, when the glass batch of the curved glass 1 includes silicon sand (silicon dioxide or quartz sand), phosphorus pentoxide, alumina, boron oxide, lithium carbonate, sodium carbonate, potassium carbonate, magnesium carbonate, calcium carbonate, and the like, and the curve glass 1 is base glass, the temperature of the cleared glass liquid may be 950° C.-1300° C., and the temperature of the mold 2 may be 450° C.-800° C. That is, when the curved glass 1 is base glass, the difference between the temperature of the cleared glass liquid and the temperature of the mold 2 is greater than or equal to 250° C. and less than or equal to 500° C. Therefore, it may be learned that, when the temperature of the cleared glass liquid is 950° C., the temperature of the mold 2 may be any value from 450° C. (950 minus 500)-700° C. (950 minus 250); when the temperature of the cleared glass liquid is 1300° C., the temperature of the mold 2 may be 800° C. (1300 minus 500); when the temperature of the cleared glass liquid is 1200° C., the temperature of the mold 2 may be any value from 700° C. (1200 minus 500)-800° C. (1200 minus 400); when the temperature of the cleared glass liquid is 1100° C., the temperature of the mold 2 may be any value from 600° C. (1100 minus 500)-800° C. (1100 minus 300); and when the temperature of the cleared glass liquid is 1000° C., the temperature of the mold 2 may be any value from 500° C. (1000 minus 500)-750° C. (1000 minus 250).

When the glass batch of the curved glass 1 includes silicon sand (silicon dioxide or quartz sand), phosphorus pentoxide, alumina, boron oxide, lithium carbonate, sodium carbonate, potassium carbonate, magnesium carbonate, calcium carbonate, and the like, and the curved glass 1 is glass ceramics, the temperature of the cleared glass liquid may be 950° C.-1300° C., and the temperature of the mold 2 may be 250° C.-500° C. That is, when the curved glass 1 is glass ceramics, the difference between the temperature of the cleared glass liquid and the temperature of the mold 2 is greater than or equal to 500° C. and less than or equal to 800° C. Therefore, it may be learned that, when the temperature of the cleared glass liquid is 950° C., the temperature of the mold 2 may be any value from 250° C. (950 minus 700)-500° C. (950 minus 450); when the temperature of the cleared glass liquid is 1300° C., the temperature of the mold 2 may be 500° C. (1300 minus 800); when the temperature of the cleared glass liquid is 1200° C., the temperature of the mold 2 may be any value from 400° C. (1200 minus 800)-700° C. (1200 minus 500); when the temperature of the cleared glass liquid is 1100° C., the temperature of the mold 2 may be any value from 300° C. (1100 minus 800)-500° C. (1100 minus 600); and when the temperature of the cleared glass liquid is 1000° C., the temperature of the mold 2 may be any value from 250° C. (1000 minus 750)-500° C. (1000 minus 500).

In the compression molding process, the cleared glass liquid is introduced into the mold 2 cavity, and then is pressurized by combined molds, so that the glass liquid is solidified to a glass product 3 having a substantially same appearance as a surface shape of the cavity. In this process, the temperature of the mold 2 is a compression molding temperature, and a compression molding time may be a time required for cooling the temperature of the cleared glass liquid to the same temperature as the mold 2.

In the foregoing mold combining process, a too large or too small die clearance affects product molding. In the case of a too large die clearance, the product may be incomplete. In the case of a too small die clearance, the product may have too many burrs and trimmings. Therefore, the die clearance should not be too large or too small.

In some embodiments, a difference between the size of the die clearance and the thickness of the curved glass 1 at a corresponding position does not exceed 0.1 mm. That is, regardless of an equal-thickness product or an unequal-thickness product, the difference between the size of the die clearance and the thickness of the curved glass 1 at the corresponding position does not exceed 0.1 mm, so that uniformity of the die clearance can be maintained as much as possible, and in addition, a case in which the die clearance is too large or too small can be avoided.

In some embodiments, in the compression molding process, the compression molding pressure is 0.1 Mpa-0.5 Mpa. Molding quality can be improved.

In some embodiments, in the compression molding process, a working environment of compression molding is a vacuum or inert gas protection atmosphere. Molding may be performed in a molding machine. The inert gas may be nitrogen, argon, or the like.

A material of the mold is not specifically limited. Because a preparation process needs to be performed in a high-temperature and high-pressure environment, in some embodiments, the material of the mold 2 may be a superhard alloy material or a graphite material, a surface of the superhard alloy material may be plated with a superhard coating (such as titanium nitride or a diamond-like film), and the superhard alloy material may be steel. A surface of the graphite material may be plated with silicon carbide or the like.

The difference between the size of the glass product 3 and the size of the curved glass 1 is not specifically limited, provided that the size of the glass product 3 is greater than the size of the curved glass 1, and the glass product 3 can be machined into the curved glass 1 by means of subsequent mechanical processing or the like.

In some embodiments, a difference between the size of the glass product 3 and the size of the curved glass 1 is greater than or equal to 0.02 mm and less than or equal to 0.5 mm. The size and the shape of the glass product 3 may be changed by means of CNC (Computerized Numerical Control, computerized numerical control) precision machining, to obtain curved glass 1 with stable processing quality, high processing precision, and high repetition precision, which can be used for batch production.

S3. Anneal the molded glass product 3.

After the glass product 3 is demolded, a temperature is relatively high. If the glass product 3 is directly cooled naturally at a room temperature, it is easy to crack, and consequently, the glass product 3 is broken. Therefore, the glass product 3 needs to release thermal stress to the room temperature by means of slow cooling, that is, the glass product 3 may be annealed. In the annealing process, the glass product 3 may be still placed in a mold.

Annealing is a heat treatment process for a material, including a metal material and a non-metal material. For example, for the glass product, annealing is a process in which the glass product is slowly heated to a specific temperature, maintained for a sufficient period of time, and then cooled at a proper rate (usually slow cooling, sometimes controlled cooling).

In some embodiments, the annealing the molded glass product 3 includes:

performing programmed cooling on the molded glass product 3, so that the molded glass product 3 is cooled to a room temperature.

The room temperature herein refers to an indoor temperature. For different regions, the indoor temperature may be an indoor temperature in a region in which the curved glass 1 is prepared. For any region, the indoor temperature may be determined based on a seasonal change and a natural environment. That is, for any region, the indoor temperature may be approximately the same as a local ambient temperature.

For example, the room temperature may be 25° C.-35° C.

Programmed cooling is a process of cooling through program control. For example, a programmed heating cavity setting program may be used to reduce the glass product 3 from a temperature after demolding to the room temperature.

In some embodiments, the performing programmed cooling on the molded glass product 3, so that the molded glass product 3 is cooled to a room temperature may include:

placing the molded glass product 3 in a heating cavity, and performing programmed cooling on the heating cavity; or successively transferring the molded glass product 3 to a plurality of heating cavities whose temperatures gradually decrease, and insulating the molded glass product 3 for a first preset time in each heating cavity, so as to perform programmed cooling on the molded glass product 3.

In these embodiments, for example, the foregoing heating cavity may be an insulating cavity of a muffle furnace.

In some embodiments, a speed of the programmed cooling may be 1° C./min-100° C./min. For example, when the molded glass product 3 is placed in a heating cavity, and programmed cooling is performed on the heating cavity, a speed of the programmed cooling of the heating cavity may be set to 1° C./min, so that the programmed cooling is completed. When the molded glass product is successively transferred to a plurality of heating cavities whose temperatures gradually decrease, and the molded glass product 3 is insulated for the first preset time in each heating cavity, to perform programmed cooling on the molded glass product 3, a temperature difference between the plurality of heating cavities may be set to 100° C., and the molded glass product is insulated for 1 min (that is, the first preset time is 1 min) in each heating cavity, so that the programmed cooling can also be completed. In addition, compared with the case that programmed cooling is performed on the molded glass product 3 in one heating cavity, a cooling speed can be improved, but a density of the molded glass product 3 after cooling is relatively low.

It should be noted herein that the foregoing describes only a case in which the curved glass 1 is base glass, and the glass product 3 is annealed after the glass product 3 is molded. It may be understood by a person skilled in the art that, when the curved glass 1 is glass ceramics, the preparation method further includes a step of performing crystallization on the glass product 3. This step may occur after annealing, or may occur before annealing, which is not specifically limited herein.

In some embodiments, in a case in which the curved glass 1 is glass ceramics, after the introducing the cleared glass liquid into a mold 2 cavity with a preset shape, and forming, by using a compression molding process, a glass product 3 with a shape corresponding to that of the curved glass 1, and before the annealing the molded glass product 3, as shown in FIG. 7, the method further includes: S4. Perform crystallization on the molded glass product 3.

Crystallization is a process in which an amorphous substance is converted into a crystal. An amorphous substance is a substance whose atom arrangement does not have a long-range order and whose melting point is not fixed, is in a metastable state, and has a tendency of spontaneously changing to a steady state. A crystal is a substance in which internal material points (atoms, molecules, and ions) are arranged periodically and repeatedly in three-dimensional space, and has a long-range order (regular arrangement in a range larger than a micron scale).

In some embodiments, the performing crystallization on the molded glass product 3 includes: as shown in FIG. 6, performing heat treatment on the molded glass product 3, so that a split phase is generated, crystal nuclei are formed, and crystals are grown in the molded glass product 3.

Heat treatment is a key step in which a predetermined crystalline phase and a glass phase are generated from the glass ceramics. After the composition of the glass product 3 is determined, the structure and performance of the glass ceramics mainly depend on a heat treatment system (heat treatment temperature and insulating time). In a heat treatment process, a phenomenon such as a split phase, crystal nucleus formation, crystal growth, and secondary crystallization formation may occur in the glass product 3. For different types of glass ceramics, the foregoing processes are also performed in different manners.

Nucleation and crystal growth of the glass ceramics are usually performed above the transition temperature Tg and below a melting point of a principal crystalline phase. Generally, nucleation processing is performed at a temperature corresponding to a viscosity of $10 \times 10^{10}$ Pa·s-$10 \times 10^{11}$ Pa·s for a period of time, so that a specific quantity of crystal nuclei are formed in the glass product 3 and distributed uniformly. For some highly devitrified glass products 3 (for example, a system in which a melt viscosity is relatively small and an alkali metal oxide content is relatively large), a nucleation phase may be avoided, and the glass product is directly heated to a crystal growth temperature. Because the glass products 3 can be nucleated during a heating process, a large quantity of crystal nuclei are generated. It can be learned that for different types of glass ceramics, the nucleation temperatures are different and the growth temperatures and the growth speeds of the crystal are different, and the insulation times at different temperatures are also different.

In some embodiments, the performing heat treatment on the molded glass product 3 may include:

placing the molded glass product 3 in a heating cavity, and performing heat treatment on the heating cavity; or successively transferring the molded glass product to a plurality of heating cavities whose temperatures gradually increase, and insulating the molded glass product 3 for a second preset time in each heating cavity, so as to perform heat treatment on the molded glass product 3.

The heat treatment process may be a programmed heating process, which is similar to the foregoing programmed cooling process. The programmed heating is a process of heating through program control. A programmed heating cavity setting program may be used to increase the glass product 3 from a temperature after demolding to a specific temperature.

In these embodiments, for example, the foregoing heating cavity may also be a heating cavity of a muffle furnace.

The speed of programmed heating and the insulating time may be determined based on a type of the glass ceramics, a size and a quantity of a minicrystal, and a property and a quantity of a residual glass phase, which is not specifically limited herein.

In some embodiments, for different types of glass ceramics, in the foregoing preparation process, a temperature change range of heat treatment may be from a first temperature to a second temperature. The first temperature is a temperature of the mold 2 corresponding to the molded glass product 3, and a difference between the second temperature and the first temperature is greater than or equal to 100° C. and less than or equal to 400° C. A temperature condition required for crystal growth in the glass ceramics can be met, and a crystallinity degree can be increased.

According to the foregoing case in which when the curved glass 1 is glass ceramics, the temperature of the mold 2 is 250° C.-500° C., it may be learned that the first temperature may be 250° C.-500° C. In this case, it may be learned that the second temperature may be 350° C.-900° C. based on that the difference between the second temperature and the first temperature is greater than or equal to 100° C. and less than or equal to 400° C.

For example, in some embodiments, the second temperature may be 800° C. In this case, when the first temperature is 250° C., the glass product 3 is heat-treated in a temperature range of 250° C.-800° C., and crystals are precipitated in the glass product 3. When the first temperature is 500° C., the glass product 3 is heat-treated in a temperature range of 500° C.-800° C., and crystals are precipitated in the glass product 3.

In some embodiments, the insulating time of heat treatment is 5 min-24 h. Herein, the insulating time of heat treatment is related to the first temperature. When the first temperature is relatively high, a crystal may be grown to a required size and quantity in a relatively short insulating time at a relatively high temperature. When the first temperature is relatively low, a crystal may be grown to a required size and quantity in a relatively long insulating time.

It should be noted herein that the insulating time herein is a total time of the heat treatment process.

S5. Process the annealed glass product 3 into the curved glass based on the shape and the size of the curved glass 1.

After the glass product 3 is prepared, because the size of the glass product 3 is greater than the size of the curved glass, the curved glass 1 may be obtained by processing the annealed glass product 3.

For example, a CNC method may be used to process the shape and the size of the annealed glass product 3 to obtain the curved glass 1.

An embodiment of the present disclosure provides a preparation method for curved glass 1. A glass melt is directly introduced into a mold 2, and a 3D form required for the curved glass 1 is prepared by a compression molding process, and then gradually cooled to a room temperature. The shape and size of the cooled 3D glass are trimmed by using CNC machining to obtain the curved glass 1. Compared with a related technology in which the curved glass 1 is formed from plate glass (that is, 2D glass) by means of hot bending, a resource waste caused by a high temperature to a low temperature can be reduced because a forming process of the plate glass from a high temperature to a low temperature is omitted, and production costs of the curved glass 1 can be reduced.

For example, in a related technology, that the curved glass 1 is base glass of equal thickness is used as an example. A preparation route of the curved glass 1 is shown in FIG. 8. First, a plate glass (2D glass) is prepared by using a float glass process or an overflow method, and then the prepared plate glass is cut, CNC processed, and cleaned, and then hot bent to obtain the curved glass. In this process, the plate glass may be completed by a glass raw material factory. After a molding process from a high temperature to a low temperature for the first time, the plate glass may be prepared into curved glass, which may be completed by a cover plate factory. A molding process from a high temperature to a low temperature for the second time is then completed. That is, a total of two molding processes from a high temperature to a low temperature are performed. Using an example in which the curved glass 1 is glass ceramics of equal thickness, a preparation route of the curved glass 1 is shown in FIG. 9. First, a glass melt is poured or calendered for the first time of molding, and this process may be completed in a glass raw material factory. Then, the molded glass needs to be molded for the second time by cutting, grinding, and polishing. This process may be completed in a thinning factory. Finally, a cover plate factory performs 3D hot bending molding on the glass obtained after the second time of molding. That is, the third molding process is performed. In this process, a total of three times of molding processes from a high temperature to a low temperature are performed. In addition, when the curved glass 1 has an unequal thickness, as shown in FIG. 10, entire surface processing needs to be performed during CNC processing, which further causes a processing resource loss and further increases costs.

After the curved glass 1 is prepared, 32 samples produced by the same process are randomly selected to calculate a process capability test. A process capability index CPK (Complex Process Capability index) is 1-1.5 based on a control size of ±0.07 mm. The process capability index is used to represent an actual processing capability in a control state (stable state), which indicates that a process of the preparation method provided in this embodiment of the present disclosure has a relatively strong capability of ensuring quality, and the obtained curved glass has good size stability.

Some embodiments of the present disclosure provide curved glass prepared by using the foregoing preparation method for curved glass.

The curved glass has a same technical effect as the foregoing preparation method for curved glass, and details are not described herein again.

In some embodiments, when the curved glass is glass ceramics, and a principal crystalline phase of the curved glass includes one or two of petalite and lithium disilicate, a crystallinity degree of the curved glass is 75 wt %-90 wt %; and when the principal crystalline phase of the curved glass is lithium metasilicate or cordierite, a crystallinity degree of the curved glass is 30 wt %-50 wt %.

A structure and physical and chemical performance of the glass ceramics are related to a crystallinity degree and a principal crystalline phase, and the crystallinity degree and the principal crystalline phase of the glass ceramics are related to a heat treatment system. Therefore, glass ceramics with a required crystallinity degree and principal crystalline phase may be obtained by controlling the heat treatment system. When the heat treatment system is the same, the curved glass has a crystallinity degree and a principal crystalline phase that are approximately the same as those of the curved glass prepared in the related technology.

In some embodiments, it is found by experiment that, in the curved glass prepared by using the foregoing preparation method, when the curved glass 1 is base glass, a Vickers hardness of the curved glass 1 is 550 kgf/mm²-650 kgf/mm²; and when the curved glass 1 is glass ceramics, a Vickers hardness of the curved glass 1 is 650 kgf/mm²-750 kgf/mm². It can be learned from this that, under a same test condition, the curved glass 1 has an approximately equivalent hardness to that of the curved glass prepared in the related technology, and can meet an application requirement.

The Vickers hardness may be obtained by testing the curved glass 1 by using a Vickers hardmeter.

For example, when the curved glass is glass ceramics, the principal crystalline phase of the glass ceramics is cordierite, and the crystallinity degree is 30 wt %-50 wt %, the Vickers hardness of the curved glass 1 may be 650 kgf/mm²-700 kgf/mm². When the principal crystalline phase of the glass ceramics is one or two of lithium disilicate and petalite, and the crystallinity degree is 75 wt %-90 wt %, the Vickers hardness of the curved glass 1 may be 700 kgf/mm²-750 kgf/mm².

In some embodiments, it is found by experiment that, in the curved glass prepared by using the foregoing preparation method, when the curved glass is base glass, a Young's modulus of the curved glass is 70 Gpa-90 Gpa; and when the curved glass is glass ceramics, a Young's modulus of the curved glass is 90 Gpa-105 Gpa. According to Hooke's law, within an elastic limit of an object, stress is proportional to strain, and a ratio is referred to as a Young's modulus of a material. A size of the Young's modulus indicates rigidity of a material. A larger Young's modulus indicates less deformation. It can be learned that, under a same test condition, the curved glass 1 has an approximately equivalent Young's modulus to that of the curved glass prepared in the related technology, and can meet an application requirement.

For example, when the curved glass is glass ceramics, a principal crystalline phase of the glass ceramics is one of cordierite or lithium silicate, and a crystallinity degree is 30 wt %-50 wt %, a Young's modulus of the curved glass 1 is 90 Gpa-95 Gpa. When the principal crystalline phase of the glass ceramics is one or two of petalite and lithium disilicate, and the crystallinity degree is 75 wt %-90 wt %, the Young's modulus of the curved glass 1 is 95 Gpa-105 Gpa.

In some embodiments, when the curved glass is base glass, a density of the curved glass is 2.4 $g/cm^3$-2.5 $g/cm^3$; and when the curved glass is glass ceramics, a density of the curved glass is 2.45 $g/cm^3$-2.65 $g/cm^3$. The density can be measured by using a drainage method. Similarly to the foregoing embodiment, under a same test condition, the density of the curved glass 1 is approximately the same as a density of the curved glass prepared in the related technology, and can meet an application requirement.

In some embodiments, when the curved glass is base glass, a thermal expansion coefficient of the curved glass is $60\times10^{-7}/°$ C.-$110\times10^{-7}/°$ C.; and when the curved glass is glass ceramics, a thermal expansion coefficient of the curved glass is $100\times10^{-7}/°$ C.-$110\times10^{-7}/°$ C. The thermal expansion coefficient is an expansion and contraction phenomenon of an object due to a temperature change. The thermal expansion coefficient represents a change in a length quantity value caused by a change in a unit temperature. A linear expansion coefficient is used as an example. The thermal expansion coefficient refers to a ratio of a change in a length in a direction of a solid material at a temperature change of 1° C. to a length of the solid material at a temperature of 20° C. (that is, a standard laboratory environment). Under a same test condition, the thermal expansion coefficient of the curved glass 1 is equivalent to a thermal expansion coefficient of the curved glass prepared in the related technology, and can meet an application requirement.

For example, when the curved glass is glass ceramics, a principal crystalline phase of the glass ceramics is one or two of petalite and lithium disilicate, and a crystallinity degree is 75 wt %-90 wt %, the thermal expansion coefficient of the curved glass 1 is $100\times10^{-7}/°$ C.-$105\times10^{-7}/°$ C. When the principal crystalline phase of the glass ceramics is lithium silicate and the crystallinity degree is 30 wt %-50 wt %, the thermal expansion coefficient of the curved glass 1 is $105\times10^{-7}/°$ C.-$110\times10^{-7}/°$ C.

To objectively evaluate the beneficial technical effects of the embodiments of this disclosure, the following experimental examples are used to illustrate the embodiments of this disclosure in detail.

EXPERIMENTAL EXAMPLE 1

In experimental example 1, the following several experimental solutions are set to describe in detail the preparation method for the curved glass 1, which are respectively described as Solution 1, Solution 2, and Solution 3. In Solution 1, Solution 2, and Solution 3, composition of all glass batches of the curved glass is the same and includes silicon sand, phosphorus pentoxide, alumina, boron oxide, lithium carbonate, sodium carbonate, and potassium carbonate. The curved glass 1 is base glass, and an appearance shape of the curved glass is a shape required for use as a rear cover of a mobile phone.

Solution 1

Step 1): Weigh each component of a corresponding weight based on the composition of the curved glass 1, and mix into a glass batch.

Step 2): Melt the glass batch in step 1) at a high temperature of 1500° C.-1650° C. and clear it to obtain a glass solution of 950° C., where a molar percentage of $SiO_2$, $Al_2O_3$, $P_2O_5$ and $B_2O_3$ in the glass solution is 70%, and a molar percentage of $Li_2O$, $Na_2O$ and $K_2O$ is 30%.

Step 3): Introduce the cleared glass liquid into a compression molding mold plated with a superhard layer at 450° C. with an introduction amount of 20 g-30 g.

Step 4): Design a shape of the mold 2 cavity based on an appearance of a product that needs to be produced, where a difference between a maximum and a minimum position of a die clearance is less than or equal to 0.1 mm.

Step 5): The superhard mold performs compression molding on the glass liquid by using a pressure of 0.1 Mpa, and insulates the glass liquid for a period of time. After a glass product is molded, release heat stress to a room temperature by means of slow cooling at a cooling speed of 1° C./min. The cooling process is completed in one heating cavity.

Step 6): For the mold glass, optimize, by using a CNC technology, the size of the curved glass by using center point alignment, so as to obtain a required appearance size.

Solution 2

The steps in Solution 2 are basically the same as those in Solution 1. A difference is that in Solution 2, a temperature of the cleared glass liquid obtained in step 2) is 1300° C., a molar percentage of $SiO_2$, $Al_2O_3$, $P_2O_5$ and $B_2O_3$ is 85%, a molar percentage of $Li_2O$, $Na_2O$ and $K_2O$ is 7%, and a molar percentage of MgO and CaO is 8% in the glass liquid; in step 3), a temperature of the mold is 800° C.; and in step 5), pressure of compression molding is 0.5 Mpa, and a slow cooling speed is 100° C./min.

Solution 3

The steps in Solution 3 are basically the same as those in Solution 1. A difference is that in Solution 3, a temperature of the cleared glass liquid obtained in step 2) is 1000° C., a molar percentage of $SiO_2$, $Al_2O_3$, $P_2O_5$ and $B_2O_3$ is 80%, a molar percentage of $Li_2O$, $Na_2O$ and $K_2O$ is 20%, and a molar percentage of MgO and CaO is 0% in the glass liquid; in step 3), a temperature of the mold is 600° C.; and in step 5), pressure of compression molding is 0.3 Mpa, and a slow cooling speed is 50° C./min.

Experimental Example 2

In experimental example 2, the following several experimental solutions are set to describe in detail the preparation method for the curved glass 1, which are respectively described as Solution 4, Solution 5, and Solution 6. In Solution 4, Solution 5, and Solution 6, composition of all glass batches of the curved glass is the same and includes silicon sand, phosphorus pentoxide, alumina, boron oxide, lithium carbonate, sodium carbonate, potassium carbonate, and a nucleation agent zirconia. The curved glass is glass ceramics, and an appearance shape of the curved glass 1 is a shape required for use as a rear cover of a mobile phone.

Solution 4

Step 1): Weigh each component of a corresponding weight based on the composition of the curved glass 1, and mix into a glass batch.

Step 2): Melt the glass batch in step 1) at a high temperature of 1500° C.-1650° C. and clear it to obtain a glass solution of 950° C., where a molar percentage of $SiO_2$, $Al_2O_3$, $P_2O_5$ and $B_2O_3$ in the glass solution is 70%, a molar percentage of $Li_2O$, $Na_2O$ and $K_2O$ is 20%, and a molar percentage of zirconia is 10%.

Step 3): Introduce the cleared glass liquid into a compression molding mold 2 plated with a superhard layer at 250° C. with an introduction amount of 20 g-30 g.

Step 4): Design a shape of the mold 2 cavity based on an appearance of a product that needs to be produced, where a difference between a maximum and a minimum position of a die clearance is less than or equal to 0.1 mm.

Step 5): The superhard mold 2 performs compression molding on the glass liquid by using a pressure of 0.1 Mpa, and performs compression molding to obtain a 3D glass product. Then, a temperature of the 3D glass product is adjusted from 250° C. to 800° C., and an insulating time (that is, a heat treatment time) of devitrification is 24 h, to obtain 3D curved glass, so that a formed principal crystalline phase is one or two of lithium disilicate and petalite. A crystallinity degree measured by XRD (X-ray diffraction) is 90 wt %.

Step 6): The devitrified 3D curved glass ceramics release thermal stress to a room temperature by means of slow cooling at a cooling speed of 1° C./min. The cooling process is completed in a plurality of heating cavities with gradually decreasing temperatures.

Step 7): For the mold glass, optimize, by using a CNC technology, the size of the curved glass by using center point alignment, so as to obtain a required appearance size.

Solution 5

The steps in Solution 5 are basically the same as those in Solution 4. A difference is that in Solution 5, a temperature of the cleared glass liquid obtained in step 2) is 1300° C., a molar percentage of $SiO_2$, $Al_2O_3$, $P_2O_5$ and $B_2O_3$ is 75%, a molar percentage of $Li_2O$, $Na_2O$ and $K_2O$ is 18%, a molar percentage of MgO and CaO is 6%, and a molar percentage of zirconia is 1% in the glass liquid; in step 3), a temperature of the mold is 800° C.; in step 5), pressure of compression molding is 0.5 Mpa, and an insulating time (that is, a heat treatment time) of devitrification is 5 min; and in step 6), a cooling speed is 100° C./min, and in Solution 5, a principal crystalline phase is lithium silicate, and a crystallinity degree is 30 wt %.

Solution 6

The steps in Solution 6 are basically the same as those in Solution 4. A difference is that in Solution 6, a temperature of the cleared glass liquid obtained in step 2) is 1000° C., a molar percentage of $SiO_2$, $Al_2O_3$, $P_2O_5$ and $B_2O_3$ is 85%, a molar percentage of $Li_2O$, $Na_2O$ and $K_2O$ is 7%, a molar percentage of MgO and CaO is 4%, and a molar percentage of zirconia is 4% in the glass liquid; in step 3), a temperature of the mold is 800° C.; in step 5), pressure of compression molding is 0.5 Mpa, and an insulating time (that is, a heat treatment time) of devitrification is 10 h; and in step 6), a cooling speed is 50° C./min, and in Solution 6, a principal crystalline phase is cordierite, and a crystallinity degree is 45 wt %.

Conclusion: Each curved glass 1 obtained in the foregoing experimental example 1 and experimental example 2 meets a design requirement of a rear cover of a mobile phone, and a crystallinity degree of curved glass ceramics may be 30 wt % or more, and may be up to 90 wt %. Therefore, the curved glass ceramics can meet an application requirement.

In conclusion, a glass melt is directly introduced into a mold 2, and a 3D form required for the curved glass 1 is prepared by a compression molding process, and then gradually cooled to a room temperature. The shape and size of the cooled 3D glass are trimmed by using CNC machining to obtain the curved glass 1. Compared with a related technology in which the curved glass 1 is formed from plate glass by means of hot bending, because a forming process of the plate glass from a high temperature to a low temperature is omitted, a molding process from a high temperature to a low temperature can be reduced, and a preparation process can be shortened. Therefore, a resource waste caused from a high temperature to a low temperature in the related technology can be reduced, and manufacturing costs are reduced. The obtained curved glass has same physical and chemical performance as that prepared by using the preparation method provided in the related technology, and can meet a cover requirement of an electronic device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A preparation method for curved glass, comprising:
melting a glass batch into a glass liquid, and clearing the glass liquid;
introducing the cleared glass liquid into a mold cavity of a mold with a preset shape, and forming, by using a compression molding process, a molded glass product with a shape corresponding to that of the curved glass, wherein a size of the molded glass product is greater than a size of the curved glass, and wherein a difference between the size of the molded glass product and the size of the curved glass is greater than or equal to 0.02 mm and less than or equal to 0.5 mm;
annealing the molded glass product; and
processing the annealed glass product into the curved glass based on the shape and the size of the curved glass.

2. The preparation method according to claim 1, wherein a difference between a temperature of the cleared glass liquid and a temperature of the mold is greater than or equal to 250° C. and less than or equal to 500° C.

3. The preparation method according to claim 2, wherein the temperature of the cleared glass liquid is 950° C.-1300° C., and the temperature of the mold is 450° C.-800° C.

4. The preparation method according to claim 1, wherein the curved glass is glass ceramics, wherein the glass batch further comprises a nucleation agent, and wherein the preparation method further comprises:

after the introducing the cleared glass liquid into the mold cavity with the preset shape, and the forming, by using the compression molding process, the molded glass product with the shape corresponding to that of the curved glass, and before the annealing the molded glass product:

performing crystallization on the molded glass product.

5. The preparation method according to claim 4, wherein a difference between a temperature of the cleared glass liquid and a temperature of the mold is greater than or equal to 500° C. and less than or equal to 800° C.

6. The preparation method according to claim 5, wherein the temperature of the cleared glass liquid is 950° C.-1300° C., and the temperature of the mold is 250° C.-500° C.

7. The preparation method according to claim 4, wherein the performing the crystallization on the molded glass product comprises:

performing heat treatment on the molded glass product, so that a split phase is generated, crystal nuclei are formed, and crystals are grown in the molded glass product.

8. The preparation method according to claim 7, wherein the performing the heat treatment on the molded glass product comprises:

placing the molded glass product in a heating cavity, and performing the heat treatment on the heating cavity; or successively transferring the molded glass product to a plurality of heating cavities whose temperatures gradually increase, and insulating the molded glass product for a preset time in each heating cavity, so as to perform the heat treatment on the molded glass product.

9. The preparation method according to claim 7, wherein a temperature change range of the heat treatment is from a first temperature to a second temperature, and wherein the first temperature is a temperature of the mold corresponding to the molded glass product, and a difference between the second temperature and the first temperature is greater than or equal to 100° C. and less than or equal to 400° C.

10. The preparation method according to claim 1, wherein the annealing the molded glass product comprises:

performing programmed cooling on the molded glass product, so that the molded glass product is cooled to a room temperature.

11. The preparation method according to claim 10, wherein the performing the programmed cooling on the molded glass product, so that the molded glass product is cooled to the room temperature comprises:

placing the molded glass product in a heating cavity, and performing the programmed cooling on the heating cavity; or successively transferring the molded glass product to a plurality of heating cavities whose temperatures gradually decrease, and insulating the molded glass product for a preset time in each heating cavity, so as to perform the programmed cooling on the molded glass product.

12. The preparation method according to claim 10, wherein a speed of the programmed cooling is 1° C./min-100° C./min.

13. The preparation method according to claim 1, wherein in the compression molding process, a difference between a size of a die clearance and a thickness of the curved glass at a corresponding position is greater than or equal to o and less than or equal to 0.1 mm, the die clearance being a gap between a movable mold of the mold and a fixed mold of the mold.

14. The preparation method according to claim 1, wherein in the compression molding process, compression molding pressure is 0.1 Mpa-0.5 MPa.

15. The preparation method according to claim 1, wherein in the compression molding process, a working environment of compression molding is a vacuum or inert gas protection atmosphere.

16. The preparation method according to claim 1, the processing the annealed glass product comprising:

cutting the annealed glass product.

17. The preparation method according to claim 1, wherein the mold is made of an alloy material or a graphite material, and wherein a surface of the mold is coated with a protective layer made of titanium nitride, a diamond-like film, or silicon carbide.

18. The preparation method according to claim 1, wherein the preparation method achieves a process capability index (CPK) of 1-1.5 based on dimensional control of ±0.07 mm.

19. The preparation method according to claim 1, the introducing the cleared glass liquid into the mold cavity comprising:

controlling an introduction amount between 20 g and 30 g per molding operation.

20. The preparation method according to claim 1, the compression molding process maintaining a controlled thermal gradient between the cleared glass liquid and the mold to prevent thermal shock and avoid devitrification of the molded glass product.

* * * * *